United States Patent
Chen et al.

(10) Patent No.: US 9,394,183 B2
(45) Date of Patent: *Jul. 19, 2016

(54) METHOD FOR PRODUCING A HIGH-PURITY NANOMETER ZINC OXIDE FROM ELECTROLYTIC ZINC ACID LEACHING RESIDUES BY AMMONIA DECARBURIZATION

(71) Applicant: SICHUAN XINHONG TECHNOLOGY CO., LTD, Chengdu, Sichuan (CN)

(72) Inventors: Shangquan Chen, Chengdu (CN); Shichun Li, Chengdu (CN); Xiaohong Li, Chengdu (CN)

(73) Assignee: SICHUAN XINHONG TECHNOLOGY CO., LTD, Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/430,543

(22) PCT Filed: Sep. 25, 2012

(86) PCT No.: PCT/CN2012/081873
§ 371 (c)(1),
(2) Date: Mar. 23, 2015

(87) PCT Pub. No.: WO2014/047760
PCT Pub. Date: Apr. 3, 2014

(65) Prior Publication Data
US 2015/0246822 A1 Sep. 3, 2015

(51) Int. Cl.
*C01G 9/02* (2006.01)
*B82Y 40/00* (2011.01)

(52) U.S. Cl.
CPC . *C01G 9/02* (2013.01); *B82Y 40/00* (2013.01); *C01P 2006/12* (2013.01); *C01P 2006/80* (2013.01)

(58) Field of Classification Search
CPC ... C01G 9/02; C01P 2006/12; C01P 2006/80; B82Y 40/00
See application file for complete search history.

(56) References Cited

FOREIGN PATENT DOCUMENTS

| CN | 1065685 A | 10/1992 |
|----|-----------|---------|
| CN | 1986421 A | 6/2007 |
| CN | 101125677 A | 2/2008 |
| CN | 101886180 A | 11/2010 |
| CN | 102168190 A | 8/2011 |
| CN | 102515252 A | 6/2012 |

OTHER PUBLICATIONS

English machine translation of CN102515252.*
English machine translation of CN101125677.*
English machine translation of CN101665263.*
International Search Report of PCT Patent Application No. PCT/CN2012/081873 issued on Jul. 4, 2013.

* cited by examiner

*Primary Examiner* — Richard M Rump

(57) ABSTRACT

Disclosed is a method for producing a high-purity nanometer zinc oxide from electrolytic zinc acid leaching residues by ammonia decarburization. The method comprises: adding 0.3-0.5 kg of sodium fluorosilicate to per cubic meter of ammonia water-ammonium bicarbonate solution when leaching, and then adding 30-60 kg of slaked lime to per cubic meter of a leached solution for carrying out decarburization and refining treatment. The present invention obtained nanometer zinc oxide powder has purity of 99.7% or up, uniform particle size distribution (average particle size of 10-30 nm), specific surface area of 105 $m^2/g$ or up, good fluidity and good dispersity. The treatment method is characterized by low energy consumption and high efficiency; all valuable and harmful heavy metals in the electrolytic zinc acid leaching residues are leached out to be reasonably utilized and cleaned with water, so that the obtained final leached residues are converted from electrolytic zinc acid leaching residues as high hazard wastes into ordinary solid wastes. It obtained good economic benefit and social benefit.

10 Claims, No Drawings

METHOD FOR PRODUCING A HIGH-PURITY NANOMETER ZINC OXIDE FROM ELECTROLYTIC ZINC ACID LEACHING RESIDUES BY AMMONIA DECARBURIZATION

CROSS REFERENCE OF RELATED APPLICATION

This is a national phase application of an international patent application number PCT/CN2012/081873 with a filing date of Sep. 25, 2012. The contents of these specifications, including any intervening amendments thereto, are incorporated herein by reference.

BACKGROUND OF THE PRESENT INVENTION

1. Field of Invention

The present invention relates to a method for producing zinc oxide, and more particularly to a method for producing high-purity nanometer zinc oxide.

2. Description of Related Arts

At present, the zinc hydrometallurgy mainly adopts the production process of roasting, leaching and electrolysis. In the acid leaching residue which is discharged by said production process, the mass percent content of zinc is in general 6~9%, and sometime as high as 20%. The phase analysis and X-ray difpercent analysis made for said acid leaching residue have shown that, the zinc in said leaching residue mainly exists in a form of $ZnFe_2O_4$ and zinc silicate. Meanwhile, the mass percent of sulfur is 6-12%, of which, the mass percent of sulfate radical is 15-30%. The content of calcium and magnesium in the mine vary, with the ions such as $Cu^{2+}$, $Pb^{2+}$, $Cd^{2+}$, $Ni^{2+}$, $Hg^{2+}$, $As^{3+}$, and the mass percents are as follows: copper 1%, lead 0.8%, iron 4%, silicon 3%, arsenic 0.3%, silver 0.003%, calcium 12%, and magnesium 3%. In order to recycle the zinc, the current treatment methods include pyrometallurgy and hydrometallurgy. Said pyrometallurgy contains kiln volatilization method (namely Waelz process) and fuming furnace volatilization method, such as the method of Chinese patent application with publication number CN101886180. Said hydrometallurgy contains hot acid leaching and high temperature & pressure leaching. The pyrometallurgy need a long technological process, large amount of equipment maintenance, high investment, poor working conditions, consume a large amount of coal or metallurgical coking coal, and the efficiency is low and environmental pollution is great. Therefore, it usually adopts hot acid leaching or high pressure leaching. These methods still have the drawbacks as follows: ① consuming a large amount t of acid, ② high pressure of iron removal, consuming more reagents, ③ equipments have serious corrosion owing to high temperature and high pressure. The equipments are complex, with high investment; ④ high operating costs, low economic efficiency. ⑤ the discharge of these present methods is acid residue, so they bring new pollution, it has no choice but to bury, not only pollute the environment, but also a waste of resources.

The most ideal processing method for the acid leaching residue is the selective leaching of zinc, it make the zinc entering into the final leached solution, and recycle zinc valuably.

High-purity zinc oxide usually refers to the zinc oxide product with the mass percent ≥99.7%. The high-purity zinc oxide is an indispensable raw material for the modern high technologies, with wide applications. It is mainly used in glass, feed, ceramics, dyes, paint, paper-making, rubber, pesticides, oil refining, galvanization, special steel, alloy, defence-related science and technology, etc. The glass, paper-making, or rubber, oil refining enterprises have high demands for zinc oxide and very high purity requirement.

Nanometer zinc oxide (ZnO) is a new type of high-function fine inorganic product with the particle size between 1 and 100 nm in the $21^{st}$ century, exhibiting a variety of special properties such as non-migratory, fluorescence, piezoelectric, absorption and UV scattering ability, etc. With its special optical, electrical, magnetic and sensitivity performance, it can be used to produce gas sensors, phosphors, rheostat, UV shielding materials, image recording materials, piezoelectric materials, varistors, efficient catalysts, magnetic materials, and plastic films, etc.

Currently the methods producing zinc oxide mainly include chemical precipitation method, sol-gel method, microemulsion method and hydrothermal synthesis method, etc. But all raw materials used are zinc calcine or pure zinc salts (such as zinc sulfate, zinc nitrate or zinc acetate) with the zinc content higher than 50%.

Ammonia method is a commonly used method for producing zinc oxide. Currently, the ammonia method (ammonia-ammonium bicarbonate combined leaching method) for producing zinc oxide generally includes the following steps: leaching of zinc-containing materials using ammonia-ammonium bicarbonate as leaching agent, and after purification, ammonia evaporation crystallization, drying, calcinations of zinc-amine complexing solution, produce the zinc oxide product.

Above-mentioned traditional ammonia method for producing zinc oxide has not been used in electrolytic zinc acid leaching residue, mainly due to the following reasons:

1) Electrolytic zinc acid leaching residue is wrapped by a large amount of calcium sulfate, which cause it difficult to leach out zinc and the recovery rate is low.

2) Electrolytic zinc acid leaching residue contains 15-30% sulfate radical, so a large amount of ammonia converts into ammonium sulfate, with high ammonia consumption;

3) The zinc-ammine complexing solution after leaching is directly purified by conventional method, and finally the heavy metal is removed by zinc replacement method. Since there exists a large amount of free ammonia in the solution, with strong impurity complex, it is easy to produce redissolution phenomenon, affecting the purification effect and finally affecting the purity of zinc oxide product.

4) Due to the presence of large amount of ammonium sulfate in liquid, part of zinc ammonium sulfate double salt precipitation will occur in the ammonia evaporation process, and finally affecting the purity of zinc oxide.

Currently, the disclosed technologies of producing nanometer zinc oxide by ammonia leaching method are low-temperature hydrolysis methods, for example:

Chinese Patent Application No. 92103230.7 discloses an improved technology for producing zinc oxide aiming at traditional ammonia complexometry. The purified zinc-ammonia complexing solution is diluted with water to hydrolyze part of zinc-ammonia complexing solution and obtain the basic zinc carbonate (with a ratio of zinc hydroxide and zinc carbonate of 2:1), and then continue to heat until zinc-ammonia complexing solution is decomposed completely. After high-temperature calcinations, 30-100 nn nanometer zinc oxide is obtained.

For the patented technology, the following problems need to be solved:

After hydrolysis, in the thermal decomposition process of undissociated zinc-ammonia complexing solution, the newly generated basic zinc carbonate will continue to grow on the original surface of crystal nucleus, promoting the growing of originally hydrolyzed crystal, which is prone to cause uneven zinc carbonate crystal, making it difficult to control the particle size of the final product.

It adds 4-10 times of water, reducing the efficiency in the preparation process, increasing the energy consumption and the water treatment cost at the back end.

Chinese Patent Application No. 200610130477.7 disclosed an improved technology producing zinc oxide for the traditional ammonia complex method. The zinc-ammonia complexing solution is mixed with 1:2-20 of hot water or hot mother liquor continuously. After heating and heat preservation, it is recycled to be used in hydrolysis of zinc-ammonia complexing solution, to prepare 10-50 nn of nanometer zinc oxide.

For the patented technology, the following problems need to be solved:

After hydrolysis of mother liquor, the ammonia cannot be fully separated, and it cannot achieve the hydrolysis effect, and finally the zinc-ammonia complexing solution is mixed with the zinc-ammonia complexing solution.

For the above two patents, the nanometer crystals are obtained by slightly changing pH value with a large amount of water. In fact, relying solely on the pH value slight change, only a very small part of hydrolysis can be achieved (checked from the ammonium hydroxide solubility curve of zinc oxide). The higher concentration of zinc ammonia liquid, the higher the precipitation efficiency and lower energy consumption; while the lower concentration of zinc ammonia liquid, the lower the precipitation efficiency and high energy consumption. It is technically feasible by artificially increasing the proportion of water to produce nanometer zinc oxide, but it is not feasible in terms of economic efficiency.

In addition, for the current ammonia leaching method for producing zinc oxide, the crystal is basic zinc carbonate, with high decomposition temperature (the initial temperature of zinc hydroxide decomposition is about 125° C., and that of zinc carbonate is about 300° C.). In order to obtain high-purity products, it is necessary to guarantee a high decomposition temperature, generally controlled at above 500° C., to completely decompose the basic zinc carbonate. For example, in the Chinese Patent with Application No. 200610130477.7, the calcinations temperature is as high as 550° C. High-temperature calcinations seriously affect the specific surface area and dispersity of zinc oxide, and thereby affecting its application field.

In summary, for treatment process of the electrolytic zinc acid leaching residue, how to effectively leach the zinc from materials with low zinc content and get high-purity nanometer zinc oxide and to overcome the disadvantages of traditional pyrometallurgy and hydrometallurgy have become technical problems urgently to be resolved in the industry.

SUMMARY OF THE INVENTION

An objective of the present invention is to provide an effective method for recycling the zinc from electrolytic zinc acid leaching residue and producing high-purity nanometer zinc oxide.

In order to achieve the above objectives, the present invention is embodied by the follow technical solution: A method for producing a high-purity nanometer zinc oxide from electrolytic zinc acid leaching residues by ammonia decarburization, comprising the following steps:

The electrolytic zinc acid leaching residue undergoes leaching, purification for impurity removal, crystallization by ammonia evaporation, drying and calcinations, characterized in that: ammonia water-ammonium bicarbonate solution is used as the leaching agent when leaching; in said ammonia water-ammonium bicarbonate solution, the molar concentration $c(NH_3)$=5-6 mol/L, the molar concentration $c(CO_3^{2-})$=0.85-1.0 mol/L, and adding 0.3-0.5 kg sodium fluorosilicate to per cubic meter of said leaching agent, then obtain the leached solution after leaching;

After leaching, perform heating to reduce ammonia and decarburize with the following procedures: adding 30-60 kg slaked lime to per cubic meter of leached solution and stiffing, heating slowly to 90-98° C. until $c(CO_3^{2-})$≤0.3 mol/L, and then perform solid-liquid separation;

After purification for impurity removal, refining treatment is performed according to the following procedures: adding surfactant to the liquid after purification, the adding amount equal to 20-50 g per cubic meter of solution of said after purification.

The procedures for purification for impurity removal, ammonia evaporation crystallization, drying and calcinations adopt the process parameters of common ammonia method for producing zinc oxide.

In the present invention, the existing zinc oxide producing technology is applied to the treatment of electrolytic zinc acid leaching residues. Meanwhile, under the basis of existing ammonia method, add appropriate amount of sodium fluorosilicate into leaching agent. After the ammonia leaching step, add the steps of adding slaked lime to the leached solution for stirring and decarburization.

Since the electrolytic zinc acid leaching residue contains a large amount of calcium sulfate (15-30%), which as an ultrafine particle plays an isolating and blocking effect for the leaching agent, causing difficult to leach out in the acid environment, thus, in the present invention, ammonia method is adopted for leaching. Under the action of ammonia water-ammonium bicarbonate solution, calcium sulfate is converted to calcium carbonate and calcium hydroxide. In the conversion process, a gap is formed to accelerate the penetration and dissolution of leaching agent, but ultrafine particles such as calcium hydroxide play a closing effect on the leaching agent. To resolve this problem, through a lot of experiments, the inventor of the present invention concluded that, appropriate amount of sodium fluorosilicate can get rid of the packing effect of ultrafine particles on the leaching material, to realize the stratification and floating of ultrafine particles.

During the decarburization and ammonia reduction step, ammonium persulfate can be added as the oxidant.

By adding the step of decarburization and ammonia reduction, and adding slaked lime, it can on one hand, eliminate the excess of free ammonia, reduce the complexing ability of impurity ion, to remove the impurity ions, enhance the purification quality and reduce the dosage of purified reagents; and on the other hand, it can remove the carbonate ion in the solution, to get the nanometer precursor zinc hydroxide precipitate with a smaller size of crystal nucleus and low decomposition temperature in the subsequent deamination hydrolysis process.

Secondly, to get zinc oxide of nanometer scale, it needs to inhibit the growth of crystal particle. The particle size and distribution range of nanometer zinc oxide obtained by the existing ammonia method is unsatisfactory, which mainly contributes to the growing of crystals in the process of treatment, particularly the treatment on the raw material such as electrolytic zinc acid leaching residue with low content of zinc. To resolve the above problems, through a lot of experiments, the inventor of the present invention concluded that add appropriate amount of surfactant to the solution of being performed Purification for impurity removal, to effectively inhibit the growth of crystal in combination with the high-speed stiffing in the process of ammonia precipitation and crystallization.

The chemical reaction equations in the leaching step are as follows:

$$ZnO + nNH_3 + H_2O \rightarrow [Zn(NH_3)n]^{2+} + 2OH^-$$

$$ZnFe_2O_4 + nNH_3 + 4H_2O \rightarrow [Zn(NH_3)n]^{2+} + 2Fe(OH)_3\downarrow + 2OH^-$$

$$ZnFe_2O_4 + nNH_3 + H_2O \rightarrow [Zn(NH_3)n]^{2+} + Fe_2O_3\downarrow + 2OH^-$$

$$Zn_2SiO_4 + 2nNH_3 \rightarrow 2[Zn(NH_3)n]^{2+} + SiO_4^{4-}$$

$$Zn(OH)_2 + nNH_3 \rightarrow [Zn(NH_3)n]^{2+} + 2OH^-$$

$$Zn + nNH_3 + 2H_2O \rightarrow [Zn(NH_3)n]^{2+} + H_2 + 2OH^-$$

$$ZnSO_4 + nNH_3 \rightarrow [Zn(NH_3)n]^{2+} + SO_4^{2-}$$

Wherein, n=1~4;

The chemical reactions in the decarburization step are as follows:

$$Ca(OH)_2 = Ca^{2+} + 2OH^-$$

$$Ca^{2+} + CO_3^{2-} \rightarrow CaCO_3\downarrow$$

$$NH_3 H_2O + NH_4HCO_3 \rightarrow 2NH_3\uparrow + CO_2\uparrow + 2H_2O$$

$$[Zn(NH_3)n]CO_3 + Ca(OH)_2 \rightarrow [Zn(NH_3)_n](OH)_2 + CaCO_3\downarrow \quad n=1\sim 4;$$

The reactions in the purification to remove impurity step:

$$S_2O_8^{2-} + Mn^{2+} + 2NH_3.H_2O + H_2O \rightarrow MnO(OH)_2\downarrow + 2NH_4^+ + 2SO_4^{2-} + 2H^+$$

$$S_2O_8^{2-} + 2Fe^{2+} + 6H_2O \rightarrow 2SO_4^{2-} + 2Fe(OH)_3\downarrow + 6H^+$$

$$AsO_4^{3-} + Fe^{3+} \rightarrow FeAs_4\downarrow$$

$$AsO_3^{3-} + S_2O_8^{2-} + H_2O \rightarrow 2SO_4^{2-} + AsO_4^{3-} + 2H^+$$

$$2H_3AsO_3 + 8Fe(OH)_3 \rightarrow (Fe_2O_3)_4As_2O_3.5H_2O\downarrow + 10H_2O$$

$$M^{2+} + S^{2-} \rightarrow MS\downarrow \text{ wherein, M represents } Cu^{2+}, Pb^{2+}, Cd^{2+}, Ni^{2+}, Hg^{2+} \text{ and other ions;}$$

$$As^{3+} + S^{2-} \rightarrow As_2S_3\downarrow$$

$$Y^{2+} + Zn \rightarrow Zn^{2+} + Y, \text{ wherein, Y represents } Cu^{2+}, Pb^{2+}, Cd^{2+}, Ni^{2+} \text{ and other ions;}$$

Reaction equations in the ammonia evaporation step:

$$[Zn(NH_3)_n]^{2+} + 2OH^- = Zn(OH)_2\downarrow + nNH_3\uparrow \quad n=1\sim 4$$

$$[Zn(NH_3)_4]CO_3 + H_2O \rightarrow Zn(OH)_2\downarrow + CO_2\uparrow + 4NH_3\downarrow$$

Chemical reaction equation in the drying and calcinations step:

$$Zn(OH)_2 \rightarrow ZnO + H_2O\uparrow.$$

Preferably, add surfactant additionally with the amount of 0.03 kg-0.05 kg per cubic meter of said ammonia water-ammonium bicarbonate solution. The surfactants can be selected from SDS, etc. The surfactants can reduce the surface energy, and when combined with sodium fluorosilicate, it can get rid of the coating effect of ultrafine particles, increasing the penetration ability of the leaching agent and enhancing the recovery rate of zinc.

Further, add dicyandiamide additionally with the amount of 0.5 kg~1 kg per cubic meter of said ammonia water-ammonium bicarbonate solution. Dicyandiamide, as an ammonia stabilizer, can reduce the volatilization of ammonia in the leaching process, improve the working environment of leaching and reduce the loss of ammonia.

Preferably, in the step of said refining treatment, add ammonium phosphate additionally with the amount of 1-3 kg per cubic meter of solution of said after Purification for impurity removal.

Preferably, wet ball-milling leaching is adopted when leaching simultaneously. The leaching methods include wet ball-milling, leaching combined mechanical with chemical activation.

When wet ball-milling leaching mode is adopted, it can enhance the leaching efficiency because it can damage crystal structure of original ore and activation and leaching are performed simultaneously.

Preferably, after leaching step and before decarburization step, pre-evaporation ammonia is performed: heat the leached solution to 90-98° C. for ammonia evaporation, and add ammonium persulfate additionally with the amount of 2-4 kg per cubic meter of leached solution, evaporate the solution until the ammonia concentration is 2.5-3.5 mol/L. In the step of crystallization by ammonia evaporation, the temperature is controlled at 105° C. The stirring speed in the ammonia evaporation equipment is 300-500 rpm.

Preferably, after decarburization step, add ammonium fluoride to the solution with the amount of 1.5-2.0 times of the theoretical value of $Ca^{2+}$ in the solution.

Preferably, detect the zinc content of liquid in the ammonia evaporation equipment at any time in the said crystallization by ammonia evaporation step. When the zinc content is 1-1.5%, add NaOH solution to the ammonia evaporation equipment with the adding amount of 3-5 L/m$^{3'}$ and the concentration of said NaOH solution is 30% calculating by mass percent. When the mass percent of zinc is ≤0.3%, the ammonia evaporation step is finished; at this time, the solution contains a large amount of $SO_4^{2-}$ to form stable salt. It is meaningless to continue ammonia evaporation. Moreover, it will produce ammonium zinc sulfate precipitation, affecting the quality of nanometer zinc oxide product. In the late stage of ammonia evaporation, when the zinc concentration in the complexing solution is low, add NaOH to increase the pH value of the solution, which can convert $NH_4^+$ to $NH_3$, to achieve the effect of quickly evaporating ammonia and crystallizing, forming nanometer zinc hydroxide crystal nucleus.

Preferably, add $Na_2S$ to the residual filtrate after product separation to zinc precipitation, and then separate to obtain zinc sulfide filter cake and filtrate. Dry said zinc sulfide to obtain the product. Add slaked lime to said filtrate and add surfactant additionally, and stir. Indirectly heat the mixture solution and stir at a rate of 300-500 r/min Perform secondary ammonia evaporation to convert ammonium sulfate into calcium sulfate powder and the ammonia evaporation temperature is ≤105° C. The escaped ammonia is recycled through cooling and recycling, filter to get crystalline calcium sulfate; and after rinsing and drying, obtain the product of calcium sulfate powder. By recycling the wastes, it can realize the water treatment and recycling.

Preferably, said calcinations temperature is 200-300° C.

The main innovation points of the present invention are as follows: (1) add the decarburization step, to control the concentration of free $NH_3$, remove $CO_3^{2-}$ to achieve the purposes of rapid hydrolysis for precipitation of $Zn(OH)_2$, (2) In the step of ammonia evaporation, when the ammonia concentration of zinc-ammonia complexing solution is low, add NaOH to increase the PH value of the solution, convert $NH_4^+$ to $NH_3$ to realize the rapid ammonia precipitation; (3) add a surfactant (e.g. SDS) to the zinc-ammonia complexing solution to form crystal nucleus coating film and effectively control the growth of the nanometer zinc oxide crystal nucleus; (4) realize high-speed stirring through the steam power, to control the crystal nucleus of nanometer zinc oxide.

Since zinc hydroxide is obtained in the ammonia evaporation process in the present invention, the decomposition temperature and particle size of zinc hydroxide crystal nucleus are less than basic zinc carbonate crystal nucleus, when the calcinations temperature is 200-300° C., the nanometer zinc oxide power with excellent fluidity and dispersity (purity ≥99.7%, uniform particle size (average particle size of 10-30 nm), specific surface area ≥105 $m^2/g$) can be obtained. In addition, the processing method of the present invention needs low energy consumption, with high efficiency, high social and economic values. The valent and harmful heavy metals in the electrolytic zinc acid leaching residues are leached out, to achieve reasonable use, and washed clean with water. The final leached residue will be converted from hazardous waste to ordinary solid wastes, creating good economic and social benefits.

DETAILED DESCRIPTION OF THE PREFERRED EMBODIMENT

The present invention is further described in details with the embodiments. One skilled in the art will understand that the embodiment of the present invention as shown in the drawings and described above is exemplary only and not intended to be limiting.

Embodiment 1

A method for producing nanometer lithopone from electrolytic zinc acid leaching residue comprises the following steps:

(1) Leaching: take 500 g of electrolytic zinc acid leaching residue (of which, calculating as mass percent, contains 8.6% of zinc, 1.03% of copper, 32% of calcium sulfate, 0.05% of cadmium, 0.03% of arsenic), prepare 1500 ml ammonia leaching agent, of which, the concentration of $NH_3$ is 6 mol/L and the concentration of $CO_3^{2-}$ is 1.0 mol/L. Add 0.3 kg sodium fluorosilicate to per cubic meter of ammonia water-ammonium bicarbonate solution; and add the activated electrolytic zinc acid leaching residue to the above ammonia leaching agent for three-section leaching. The leaching time of each section is 2 hours. After solid-liquid separation, the obtained zinc-ammonium complexing solution contains 38.7 g of zinc (zinc recovery rate is 90.1%) and 41.72 g of sulfate radical;

(2) Decarburization: heat the zinc-ammonium complexing solution obtained in step (1) for decarburization according to the following procedures: add 60 kg of slaked lime to per cubic meter of leached solution, heat it 98° C. while stirring. When the concentration of $CO_3^{2-}$=0.29 mol/L, add 3 kg ammonium persulfate to per cubic meter of the above liquid, continue to stir for decarburization and oxidation reaction, and then isolate it by filtration;

(3) Purification for impurity removal: add 0.5 g of sodium sulfide to zinc-ammonia complexing solution, filter after stirring 2 hours, and then add 0.2 g of potassium permanganate, filter after stirring 2 hours;

(4) Refining: Add 2 kg of ammonium phosphate and 30 g of surfactant SDS to per cubic meter of liquid after purification for impurity removal;

(5) Ammonia evaporation and crystallization:

After filtering the zinc-ammonia complexing solution through refining treatment, heat it for ammonia evaporation, stir at a rate of 600 rpm. Stop ammonia evaporation when the content of zinc oxide in the liquid is 0.5%, and then filter to obtain zinc hydroxide filter cake and filtrate;

(6) Drying and calcinations: The filtered zinc hydroxide filter cake is added to 200 ml of deionized water respectively for three times of washing. During the first time of washing, add 0.05 g of sodium dodecylbenzenesulfonate. After washing, add 150 ml of ethanol to the zinc hydroxide for washing. After filter pressing, zinc hydroxide is calcined for 2 hours in a muffle furnace at 300 degrees.

The average particle diameter of nanometer zinc oxide prepared is 12.7 nm (XRD line width method), and its mass percent content is 99.7%, specific surface area is 106 $m^2/g$.

Embodiment 2

A method for producing nanometer lithopone from electrolytic zinc acid leaching residue, comprising the following steps:

(1) Leaching: take 500 g of electrolytic zinc acid leaching residue (of which, calculating as mass percent, contains 7.6% of zinc, 0.83% of copper, 28% of calcium sulfate, 0.045% of cadmium, 0.02% of arsenic), prepare 1500 ml ammonia leaching agent, of which, the concentration of $NH_3$ is 5 mol/L and the concentration of $CO_3^{2-}$ is 0.92 mol/L. Add 0.5 kg sodium fluorosilicate to per cubic meter of ammonia water-ammonium bicarbonate solution; Add 0.04 kg of surfactant SDS to per cubic meter of ammonia water-ammonium bicarbonate solution, Add 0.8 kg dicyandiamide to per cubic meter of ammonia water-ammonium bicarbonate solution, and add the activated electrolytic zinc acid leaching residue to the above ammonia leaching agent for three-section leaching, perform ball-milling while leaching. The leaching time of each section is 2.5 hours. After solid-liquid separation, the obtained zinc-ammonium complexing solution contains 41.9 g of zinc (zinc recovery rate is 91.2%) and 58.2 g of sulfate radical;

(2) Pre-evaporation ammonia: Heat the liquid part which separated by filtering in step (1) to 90° C. Add 2 kg of ammonium persulfate to per cubic meter of leached solution, and then perform ammonia evaporation until the ammonia concentration in the liquid is 3.5 mol/L;

(3) Decarburization: heat the zinc-ammonium complexing solution obtained in step (2) for decarburization according to the following procedures: add 30 kg of slaked lime to per cubic meter of leached solution, heat it 92° C. while stirring. When the concentration of $CO_3^{2-}$=0.28 mol/L, add 3.5 kg ammonium persulfate to per cubic meter of the above liquid, continue to stir for decarburization and oxidation reaction. The time of decarburization lasts 36 hours. Then add ammonium fluoride to the solution for calcium removal, the amount of ammonium fluoride is 1.5 times of theoretical value of $Ca^{2+}$ in the solution, and then isolate it by filtration;

(4) Purification for impurity removal: add 0.6 g of sodium sulfide to zinc-ammonia complexing solution, filter after stirring 2 hours, and then add 0.2 g of potassium permanganate, filter after stirring 2 hours;

(5) Refining: Add 1 kg of ammonium phosphate and 10 g of surfactant SDS to per cubic meter of liquid after purification for impurity removal;

(6) Ammonia evaporation and crystallization: after filtering the zinc-ammonia complexing solution through refining treatment, heat it for ammonia evaporation, stir at a rate of 900 rpm. Stop ammonia evaporation when the content of zinc oxide in the liquid is 0.5%, and then filter to obtain zinc hydroxide filter cake and filtrate;

(7) Add sodium sulfide for reaction to the filtrate after ammonia evaporation and crystallization. After reaction, separate it to get solid zinc sulfide and liquid portion. Add slaked lime to said liquid portion, stir it to get the mixture; add surfactant in the stirring process. Perform ammonia evaporation and crystallization of the mixture at a crystallization temperature of 100° C. Stir it in the ammonia evaporation process at a stirring rate of 300 rpm. The precipitated ammonia is cooled down and recycled. After crystallization, the calcium sulfate is rinsed and dried, to obtain calcium sulfate powder;

(8) Drying and calcinations: The filtered zinc hydroxide filter cake is added to 200 ml of deionized water respectively for three times of washing. During the first time of washing, add 0.05 g of sodium dodecylbenzenesulfonate. After washing, add 150 ml of ethanol to the zinc hydroxide for washing. After filter pressing, zinc hydroxide is calcined for 3.5 hours in a muffle furnace at 200 degrees.

The average particle diameter of nanometer zinc oxide prepared is 11.5 nm (XRD line width method), and its mass percent content is 99.75%, specific surface area is 118 $m^2/g$.

Embodiment 3

A method for producing nanometer lithopone from electrolytic zinc acid leaching residue, comprising the following steps:

(1) Leaching: take 1500 g of electrolytic zinc acid leaching residue (of which, calculating as mass percent, contains 9.0% of zinc, 0.80% of copper, 30% of calcium sulfate, 0.040% of cadmium, 0.25% of arsenic, 3% of silicon, 0.3% of arsenic, 0.003% of silver, 3% of magnesium), prepare 1500 ml ammonia leaching agent, of which, the concentration of $NH_3$ is 5.5 mol/L and the concentration of $CO_3^{2-}$ is 0.85 mol/L. Add 0.5 kg sodium fluorosilicate to per cubic meter of ammonia water-ammonium bicarbonate solution; Add 0.03 kg of surfactant SDS to per cubic meter of ammonia water-ammonium bicarbonate solution, Add 1 kg dicyandiamide to per cubic meter of ammonia water-ammonium bicarbonate solution, and add the activated electrolytic zinc acid leaching residue to the above ammonia leaching agent for three-section leaching, perform ball-milling while leaching. The leaching time of each section is 2.5 hours. After solid-liquid separation, the obtained zinc-ammonium complexing solution contains 123.66 g of zinc (zinc recovery rate is 91.6%) and 165.0 g of sulfate radical;

(2) Pre-evaporation ammonia: Heat the liquid part which separated by filtering in step (1) to 98° C. Add 1 kg of ammonium persulfate to per cubic meter of leached solution, and then perform ammonia evaporation until the ammonia concentration in the liquid is 2.0 mol/L;

(3) Decarburization: heat the zinc-ammonium complexing solution obtained in step (2) for decarburization according to the following procedures: add 60 kg of slaked lime to per cubic meter of leached solution, heat it to 96° C. while stirring. When the concentration of $CO_3^{2-}$=0.3 mol/L, add 3.2 kg ammonium persulfate to per cubic meter of the above liquid, continue to stir for decarburization and oxidation reaction. The time of decarburization lasts 42 hours. Then add ammonium fluoride to the solution for calcium removal, the amount of ammonium fluoride is 2.0 times of theoretical value of $Ca^{2+}$ in the solution, and then isolate it by filtration;

(4) Purification for impurity removal: add 0.6 g of sodium sulfide to zinc-ammonium complexing solution, filter after stiffing 2 hours, and then add 0.2 g of potassium permanganate, filter after stirring 2 hours;

(5) Refining: Add 3 kg of ammonium phosphate and 50 g of surfactant SDS to per cubic meter of liquid after purification for impurity removal;

(6) Ammonia evaporation and crystallization: after filtering the zinc-ammonia complexing solution through refining treatment, heat it for ammonia evaporation, stir at a rate of 800 rpm, the temperature is controlled under 105° C. Stop ammonia evaporation when the content of zinc oxide in the liquid is 0.5%, and then filter to obtain zinc hydroxide filter cake and filtrate;

(7) Add sodium sulfide for reaction to the filtrate after ammonia evaporation and crystallization. After reaction, separate it to get solid zinc sulfide and liquid portion. Add slaked lime to said liquid portion, stir it to get the mixture; add surfactant in the stirring process. Perform ammonia evaporation and crystallization of the mixture at a crystallization temperature of 102° C. Stir it in the ammonia evaporation process at a stirring rate of 500 rpm. The precipitated ammonia is cooled down and recycled. After crystallization, the calcium sulfate is rinsed and dried, to obtain calcium sulfate powder;

(8) Drying and calcinations: The filtered zinc hydroxide filter cake is added to 200 ml of deionized water respectively for three times of washing. During the first time of washing, add 0.05 g of sodium dodecylbenzenesulfonate. After washing, add 150 ml of ethanol to the zinc hydroxide for washing. After filter pressing, zinc hydroxide is calcined for 4.2 hours in a muffle furnace at 250 degrees.

The average particle diameter of nanometer zinc oxide prepared is 11.5 nm (XRD line width method), and its mass percent content is 99.80%, specific surface area is 112 $m^2/g$.

Embodiment 4

120 tons of raw materials are from acid leaching residue accumulated for dozens of years in Huize Smelting Plant, Yunnan Chihong Zinc and Germanium Co., Ltd. The raw material contains 11.2% of zinc, 0.91% of copper, 1.3% of lead, 27.6% of calcium sulfate, and 0.03% of cadmium.

(1) Leaching: prepare 360 $m^3$ of ammonia leaching agent, of which, the concentration of $NH_3$ is 5.6 mol/L and the concentration of $CO_3^{2-}$ is 1.1 mol/L. Add 0.4 kg sodium fluorosilicate to per cubic meter of ammonia water-ammonium bicarbonate solution; Add 0.045 kg of surfactant SDS to per cubic meter of ammonia water-ammonium bicarbonate solution, Add 0.8 kg dicyandiamide to per cubic meter of ammonia water-ammonium bicarbonate solution, and add the activated electrolytic zinc acid leaching residue to the above ammonia leaching agent for three-section leaching, perform ball-milling while leaching. The leaching time of each section is 2.6 hours. After solid-liquid separation, the obtained zinc-ammonium complexing solution contains 12.1 tons of zinc (zinc recovery rate is 90.0%) and 13.6 tons of sulfate radical;

The on-site sampling and leaching test of the leached residues are performed in "Yunnan Provincial Environmental Monitoring Center Station"—the authority designated by Yunnan Environmental Protection Agency. The leached residue meets the requirements of Class I general solid wastes in *Standards for pollution control on the storage and disposal site for general industrial solid wastes* (GB 18599-2001).

(2) Pre-evaporation ammonia: Heat the liquid part which separated by filtering in step (1) to 96° C. Add 3 kg of ammonium persulfate to per cubic meter of leached solution, and then perform ammonia evaporation until the ammonia concentration in the liquid is 3.0 mol/L;

(3) Decarburization: heat the zinc-ammonium complexing solution obtained in step (2) for decarburization according to the following procedures: add 56 kg of slaked lime to per cubic meter of leached solution, heat it to 95° C. while stirring. When the concentration of $CO_3^{2-}$=0.26 mol/L, add 3.6 kg ammonium persulfate to per cubic meter of the above liquid, continue to stir for decarburization and oxidation reaction. The time of decarburization lasts 48 hours. Then add ammonium fluoride to the solution for calcium removal, the amount of ammonium fluoride is 1.8 times of theoretical value of $Ca^{2+}$ in the solution, and then isolate it by filtration;

(4) Purification for impurity removal: add 1.5 kg of sodium sulfide to zinc-ammonium complexing solution, filter after stirring 2 hours, and then add 0.3 kg of potassium permanganate;

(5) Refining: Add 3 kg of ammonium phosphate and 50 g of surfactant SDS to per cubic meter of liquid after purification for impurity removal;

(6) Ammonia evaporation and crystallization: after filtering the zinc-ammonia complexing solution through refining treatment, heat it for ammonia evaporation, stir at a rate of 700 rpm, the temperature is controlled under 105° C. Stop ammonia evaporation when the content of zinc oxide in the liquid is 0.5%, and then filter to obtain zinc hydroxide filter cake and filtrate;

(7) Add sodium sulfide for reaction to the filtrate after ammonia evaporation and crystallization. After reaction, separate it to get solid zinc sulfide and liquid portion. Add slaked lime to said liquid portion, stir it to get the mixture; add surfactant in the stirring process. Perform ammonia evaporation and crystallization of the mixture at a crystallization temperature of 103° C. Stir it in the ammonia evaporation process at a stirring rate of 400 rpm. The precipitated ammonia is cooled down and recycled. After crystallization, the calcium sulfate is rinsed and dried, to obtain calcium sulfate powder;

(8) Drying and calcinations: The filtered filter cake is washed three times by adding ion exchange water according to a ratio of liquid to solid at 5:1. During the first time of washing, add sodium dodecylbenzenesulfonate as the amount of 1.25 g/m³. After washing, after washing, add ethanol to the zinc hydroxide filter cake for washing according to the ratio at 5:1. After filter pressing, zinc hydroxide is calcined for 2.0 hours in a muffle furnace at 280 degrees.

The average particle diameter of nanometer zinc oxide prepared is 13.2 nm (XRD line width method), and its mass percent content is 99.79%, specific surface area is 115 m²/g.

What is claimed is:

1. A method for producing a high-purity nanometer zinc oxide from electrolytic zinc acid leaching residues by ammonia decarburization comprising:

the electrolytic zinc acid leaching residue being processed by leaching, purification for impurity removal, crystallization by ammonia evaporation, drying and calcinations, comprising:

ammonia water-ammonium bicarbonate solution being used as the leaching agent; wherein said ammonia water-ammonium bicarbonate solution including molar concentration $c(NH_3)$=5-6 mol/L, molar concentration $c(CO_3^{2-})$=0.85-1.0 mol/L, and 0.3-0.5 kg sodium fluorosilicate being added to per cubic meter of said leaching agent;

performing heating to reduce ammonia and decarburize including adding 30-60 kg slaked lime to per cubic meter of leached solution and stirring, heating to 90-98° C. until $c(CO_3^{2-})$≤0.3 mol/L, and then performing solid-liquid separation;

refining treatment being performed including adding surfactant to the liquid after purification, wherein the adding amount equals to 20-50 g per cubic meter of said liquid after purification.

2. The method for producing a high-purity nanometer zinc oxide from electrolytic zinc acid leaching residues by ammonia decarburization according to claim 1, further comprising adding surfactant additionally with the amount of 0.03 kg~0.05 kg per cubic meter of said ammonia water-ammonium bicarbonate solution.

3. The method for producing a high-purity nanometer zinc oxide from electrolytic zinc acid leaching residues by ammonia decarburization according to claim 2, further comprising adding dicyandiamide additionally with the amount of 0.5 kg~1 kg per cubic meter of said ammonia water-ammonium bicarbonate solution.

4. The method for producing a high-purity nanometer zinc oxide from electrolytic zinc acid leaching residues by ammonia decarburization according to claim 1, further comprising adding ammonium phosphate with the amount of 1-3 kg per cubic meter of said liquid after purification in the step of said refining treatment.

5. The method for producing a high-purity nanometer zinc oxide from electrolytic zinc acid leaching residues by ammonia decarburization according to claim 1, wherein wet ball-milling leaching is adopted when leaching.

6. The method for producing a high-purity nanometer zinc oxide from electrolytic zinc acid leaching residues by ammonia decarburization according to claim 1, wherein after leaching step and before decarburization step, pre-evaporation ammonia is performed; including heating the leached solution to 90-98° C. for ammonia evaporation, and adding ammonium persulfate additionally with the amount of 2-4 kg per cubic meter of leached solution, evaporating the solution until the ammonia concentration is 2.5-3.5 mol/L, wherein in the step of crystallization by ammonia evaporation, the temperature is controlled at 105° C., and the stirring speed in the ammonia evaporation equipment is 300-500 rpm.

7. The method for producing a high-purity nanometer zinc oxide from electrolytic zinc acid leaching residues by ammonia decarburization according to claim 1, wherein after decarburization step, ammonium fluoride is added to the solution with the amount of 1.5-2.0 times of the theoretical value of $Ca^{2+}$ in the solution.

8. The method for producing a high-purity nanometer zinc oxide from electrolytic zinc acid leaching residues by ammonia decarburization according to claim 1, further comprising detecting the zinc content of liquid in the ammonia evaporation equipment at any time in the said crystallization by ammonia evaporation step; when the zinc content is 1-1.5%, adding NaOH solution to the ammonia evaporation equipment with the adding amount of 3-5 L/m³' and the concentration of said NaOH solution is 30% calculating by mass percent; when the mass percent of zinc is ≤0.3%, completing the ammonia evaporation step.

9. The method for producing a high-purity nanometer zinc oxide from electrolytic zinc acid leaching residues by ammonia decarburization according to claim 1, further comprising adding $Na_2S$ to the residual filtrate after product separation to zinc precipitation, separating to obtain zinc sulfide filter cake and filtrate; drying said zinc sulfide to obtain the product; adding slaked lime to said filtrate and add surfactant additionally, and stir; indirectly heating the mixture solution and stir at a rate of 300-500 r/min; performing secondary ammonia evaporation to convert ammonium sulfate into calcium sulfate powder so that the ammonia evaporation temperature is ≤105° C.; wherein the escaped ammonia is recycled through cooling and recycling, filter to get crystalline calcium sulfate; and after rinsing and drying, obtain the product of calcium sulfate powder.

10. The method for producing a high-purity nanometer zinc oxide from electrolytic zinc acid leaching residues by ammonia decarburization according to claim 1, wherein said calcinations temperature is 200-300° C.

* * * * *